United States Patent [19]

Strange

[11] Patent Number: 4,788,624
[45] Date of Patent: Nov. 29, 1988

[54] CAPACITOR HAVING CURRENT SURGE PROTECTION

[75] Inventor: Thomas F. Strange, Columbia, S.C.

[73] Assignee: North American Philips Corporation, New York, N.Y.

[21] Appl. No.: 135,875

[22] Filed: Dec. 21, 1987

[51] Int. Cl.$^4$ .............................................. H01G 1/11
[52] U.S. Cl. ..................................................... 361/272
[58] Field of Search ............................... 361/272, 275

[56] References Cited

U.S. PATENT DOCUMENTS

| | | | |
|---|---|---|---|
| 1,578,977 | 3/1926 | Frasse | 361/275 X |
| 3,155,876 | 11/1964 | Paul | 361/275 X |
| 4,237,403 | 12/1980 | Davis | 315/90 |
| 4,622,627 | 11/1986 | Rodriguez et al. | 361/400 X |
| 4,635,163 | 1/1987 | Voglaire | 361/275 |

FOREIGN PATENT DOCUMENTS 2542132  9/1984  France ................... 361/272

*Primary Examiner*—Donald A. Griffin
*Attorney, Agent, or Firm*—Robert J. Kraus

[57] ABSTRACT

A capacitor assembly including a metallized dielectric capacitor and an inductor as integral parts. The inductor, which suppresses current surges which would destroy thin metallic layer electrodes of the capacitor, includes a conductive coil in series with the capacitor and a ferromagnetic core disposed in available space in a container for the capacitor.

10 Claims, 4 Drawing Sheets

CAPACITOR HAVING CURRENT SURGE PROTECTION

BACKGROUND OF THE INVENTION

1. Field of the Invention

The invention relates to metallized dielectric capacitors, and in particular to means for protecting the relatively thin electrical connections in such capacitors from destruction by high current surges.

2. Description of the Prior Art

Metallized dielectric capacitors are popular because their thin metallic layer structure enables a large capacitance to be produced in a relatively small volume. However, such capacitors are easily destroyed by high current surges which tend to vaporize the metallic layer where it is electrically connected to lead wires or other means for connecting the capacitor in a circuit.

Typical circuits in which such destructive current surges occur are motor-start circuits and lamp-ballast circuits where the capacitor is wired to inductive loads which produce short duration current spikes during startup. Although protective surge suppressors can be wired in series with the capacitor, this detracts from the small size advantage of the metallized dielectric capacitor and increases the complexity and cost of manufacturing the circuits.

U.S. Pat. No. 4,635,163 proposes incorporating a thermal circuit breaker device within the hollow core of a capacitor disposed in a sealed casing. The device is a fusible metal strip which fits easily within the core. This device protects the capacitor against short circuits of sufficient duration and magnitude to melt a portion of the strip, but cannot provide protection against short duration current surges such as spikes which last only a few milliseconds. Further, the fusible device is destroyed when it performs its protective function, thus necessitating replacement of the capacitor.

SUMMARY OF THE INVENTION

It is an object of the invention to provide a self-protecting metallized dielectric capacitor assembly which nondestructively protects against current surges. In accordance with the invention this and other objects are achieved by incorporating in the capacitor assembly an inductor having sufficient inductance to operate as a low-pass filter for attenuating the high-frequency components of short-duration current surges. Such current surges consist primarily of high-frequency components.

Fitting an inductor within the free space remaining in a container after insertion of a capacitor is difficult, because the magnitude (and thus the size) of an inductor required for effectively suppressing current surges increases with the magnitude (and thus the size) of the capacitor. However this size limitation is overcome by disposing a ferromagnetic core of the inductor in the space unoccupied by the capacitor and by locating a conductive coil portion of the inductor wherever it conveniently fits in the assembly and at least partially surrounds the ferromagnetic core. For example, the coil may be wound directly around the ferromagnetic core, around the capacitor, or even around the exterior of the container itself.

The ferromagnetic core may be provided in different forms which are adapted to both the unoccupied space in the container and the required inductance. In one embodiment the core is provided in the form of a filler material containing ferromagnetic particles. This form is especially useful in capacitor assemblies where the capacitor is supported in the container by a potting compound with which the container is filled. The ferromagnetic filler material may be disposed wherever desired in the filled space by simply using this material in place of the potting compound which would otherwise fill the same location. Alternatively, the material may be disposed in an empty space in the assembly such as in a hollow core of the capacitor. Not only does the use of ferromagnetic filler material enable efficient space utilization, but it facilitates adjustment of the inductance of the surge-suppressing inductor. This adjustment is accomplished by controlling both the position of the filler material relative to the coil and the concentration of the ferromagnetic particles in the filler material.

In another embodiment the ferromagnetic core is provided in the form of a solid rod of ferromagnetic material. This form is especially useful for producing inductors requiring cores having higher magnetic permeabilities than are obtainable with the filler material. The use of solid rods also enables smaller inductors to be produced for use in capacitor assemblies having little free space after insertion into the container of the capacitor itself.

In yet another embodiment, an electromagnetically-actuated switch is incorporated in the capacitor assembly for cooperating with the inductor to protect against current surge pulses having energy levels which are too large to be absorbed by the inductor. This switch is normally-closed and is electrically connected in series with the inductor coil (and the capacitor). The switch includes ferromagnetic actuator means magnetically coupled to the inductor for opening the switch in response to current surges of a predefined magnitude. In a preferred configuration the actuating means is a ferromagnetic, electrically-conductive member which itself forms a first contact of the switch. This first contact is disposed adjacent the inductor and is resiliently urged against a second contact of the switch. Whenever the inductor receives a current surge having an energy content greater than that which can be tolerated by the metallic layer connection area of the capacitor, the magnetic field of the inductor saturates and applies sufficient magnetic force to the first contact to momentarily pull it away from the second contact and interrupt the flow of current through the capacitor.

DESCRIPTION OF THE PREFERRED EMBODIMENTS

Figure 1:
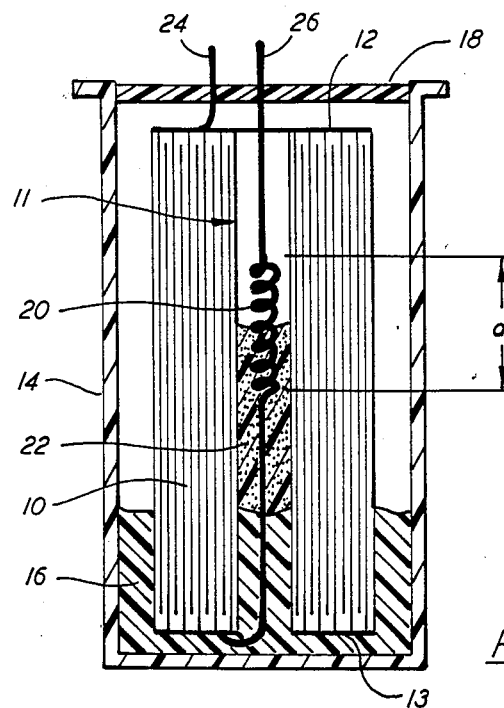
FIG. 1 is a cross-sectional view of a first embodiment of the invention.

FIG. 1 illustrates a capacitor assembly including a conventional metallized dielectric capacitor 10, but incorporating a current-surge-suppressing inductor in accordance with the invention. The capacitor 10 comprises two sheets of a metallized plastic such as mylar or polypropylene, which are wound in the form of a roll having an inner wall 11 defining a hollow central core. Alternatively, the capacitor may comprise a different type of metallized dielectric such as paper. The metallic layer on each sheet serves as one of the plates of the capacitor. The metallized dielectric forming each of these plates is shooped at its edge at a respective end of the capacitor to form one of two electrodes 12,13. The capacitor is fixed in place in a container 14 by means of a dielectric potting compound 16 which partially fills the container, and the container is closed by a lid 18. The container and the lid may be made of a conductive or insulative material, but a typical material is a plastic such as phenolic or another flame-retardant thermoplastic. The potting compound functions primarily to hold the capacitor in place, and consists of a material such as polyurethane, epoxy or polyester.

In the above-described configuration, the surge-suppressing inductor coil 20 is conveniently disposed in the hollow central core of the capacitor. A ferromagnetic filler material 22 serves as both a support for the coil and as a ferromagnetic core of the inductor. The filler material consists of an epoxy, polyurethane or polyester resin containing a concentration of ferromagnetic particles. A preferred filler material is epoxy containing 20 to 60% by weight of ferrite powder. One end of the conductor forming the coil extends through a first opening in the lid 18, where it serves as a first lead 26 of the capacitor assembly. The opposite end of this conductor is electrically connected to electrode 13 to place the inductor and the capacitor in series. Electrode 12 of the capacitor is electrically connected to another lead 24 which extends through a second opening of the lid where it serves as a second lead of the capacitor assembly.

The inductance of the inductor is determined by the configuration of the coil and the magnetic permeability of the material through which magnetic flux lines produced by the coil pass. For a linear coil inductor, such as is illustrated in FIG. 1, the inductance increases with the magnetic permeability of the material within the coil, the number of turns of the coil, and the radius of the coil. Conversely, the inductance decreases with the axial length d of the coil. A well-known general formula for the inductance of a linear coil inductor is:

$$L = k\mu N^2 R^2 / d$$

where
L is the inductance in henrys;
N is the number of turns of the coil;
R is the radius of the coil in meters;
d is the axial length of the coil in meters;
$\mu$ is the magnetic permeability in henrys per meter; and
k is a dimensionless number not greater than unity.

All of the above parameters are considered in designing an inductor which will fit within a particular capacitor assembly and have a predefined nominal inductance. During manufacture accurate adjustment of the inductance to a desired tolerance is achieved by controlling the level of the ferromagnetic filler material 22 within the hollow core of the capacitor. The inductance will vary substantially as the level is varied within the range of heights defined by the length d of the coil. The filler material is poured into the hollow core in liquid form, but quickly transforms into a solid phase.

Figure 2:
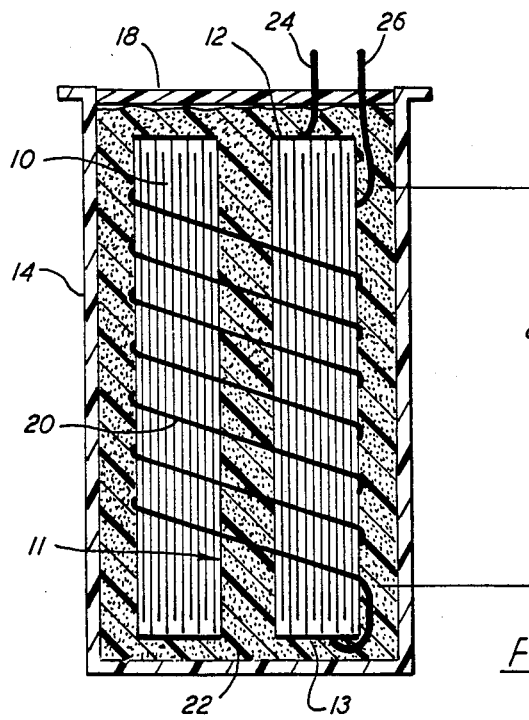
FIG. 2 is a cross-sectional view of a second embodiment of the invention.

FIG. 2 illustrates a capacitor assembly which has a configuration identical to that of FIG. 1 in all but two respects. The ferromagnetic filler material 22 fills all of the empty space in the container, and the coil 20 is wound around the capacitor rather than disposed in the hollow central core. This embodiment is useful at higher AC voltages than the FIG. 1 embodiment, because it has a greater thermal mass-to-volume ratio for dissipating heat which is internally generated during operation. Increased thermal dissipation is provided by the additional potting compound and the additional wire in the coil.

Figure 3:
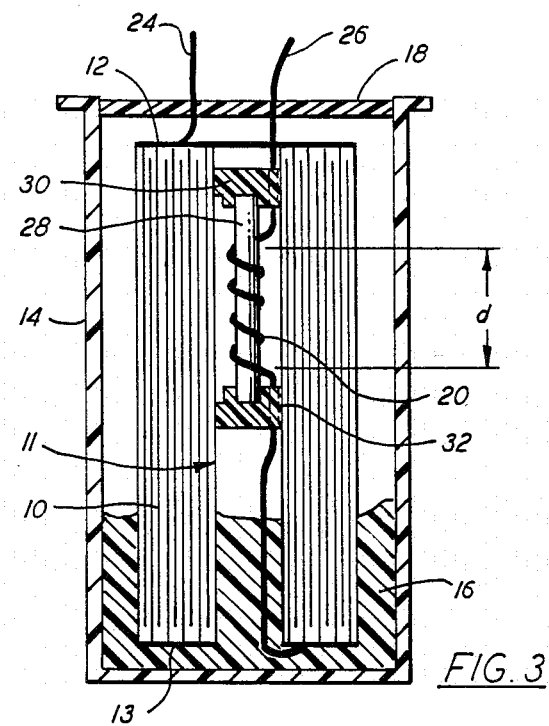
FIG. 3 is a cross-sectional view of a third embodiment of the invention.

FIG. 3 illustrates a capacitor assembly which is identical to that of FIG. 1 except for the inductor. In this case the inductor is formed by a coil 20 wound directly around a ferrite rod 28 disposed in the hollow central core of the capacitor. The ferrite rod is secured in the capacitor by means of two plastic anchors 30,32 which are pressure fitted in the hollow central core. The anchors have respective recesses for receiving opposite ends of the ferrite rod and have axially-extending holes (indicated by dashed lines) through which opposite ends of the coil wire pass to terminate at lead 26 and electrode 13. The advantages of this embodiment are a high inductance-to-volume ratio and empty space for expansion of internally-generated gases.

The embodiments of FIGS. 1, 2, and 3 have been made in the form of 12.5 microfarad capacitors and tested at an operating voltage of 240 VAC (RMS). These tests were conducted by repeatedly passing high-current surge pulses through each capacitor and measuring the capacitor's equivalent series resistance (ESR). These tests and their results are described in the following table:

| EMBODIMENT (FIG. No.) | 1 | 1 | 2 | 3 | 3 | 3 |
|---|---|---|---|---|---|---|
| INDUCTANCE (microhenries) | 25 | 50 | 20 | 5 | 25 | 60 |
| PULSE DURATION (microseconds) | 5 | 5 | 5 | 5 | 5 | 5 |
| PULSE AMPLITUDE (amps peak-to-peak) | 300 | 300 | 300 | 300 | 300 | 300 |
| ESR (ohms) | | | | | | |
| After 250,000 pulses: | 1.9 | .07 | 2.0 | failed | 1.9 | .06 |
| After 450,000 pulses: | failed | .08 | failed | failed | failed | .07 |
| QUANTITY TESTED | 3 | 3 | 1 | 3 | 3 | 3 |

The ESR data listed in the above table, where more than one capacitor of a particular type was tested, are average numbers. The word "failed" indicates that, after the specified number of tests, the ESR of the respective capacitor had reached such a large magnitude that the capacitor was inoperable. It can be observed from the table that protection against such failures for a given number of pulses increases with the inductance of the inductor incorporated in the capacitor assembly. It should be noted that the inductance needed for a given degree of protection also increases with capacitance.

Figure 5:
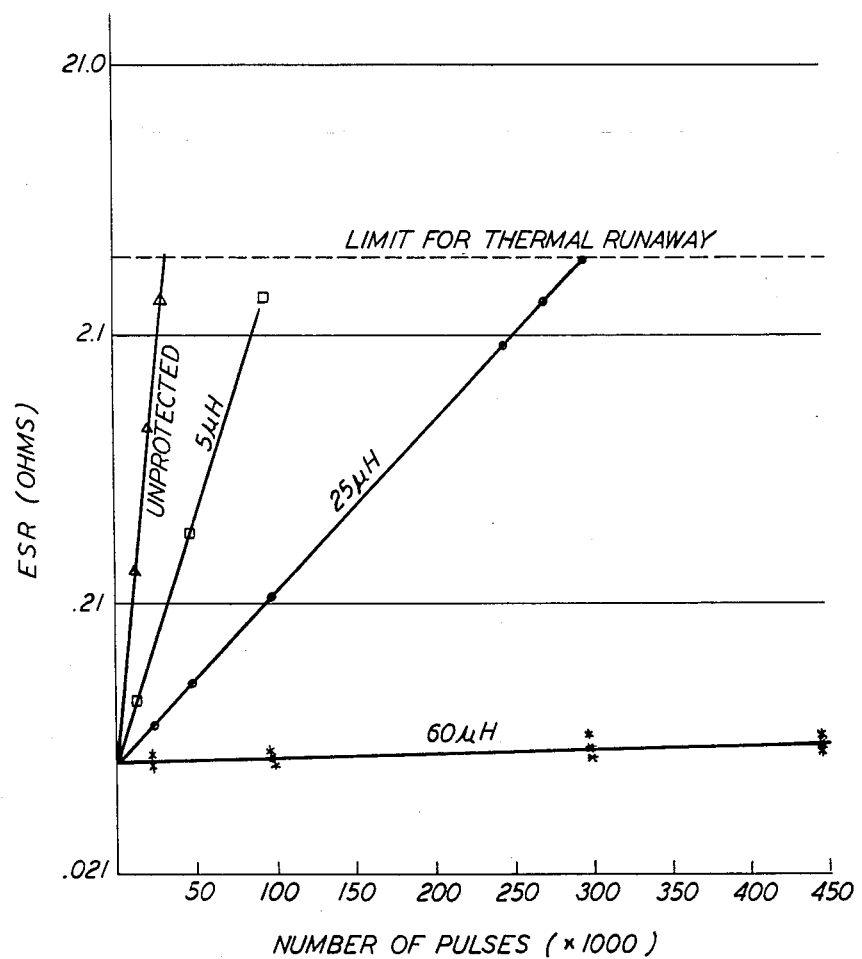
FIG. 5 is a graph showing the test results of a plurality of capacitors.

FIG. 5 is a graph comparing test data for an unprotected (no series inductor) 12.5 microfarad capacitor with the test data for the FIG. 3 embodiment capacitors described in the above table. More specifically, the graph illustrates the increase in ESR resulting from repetitively passing through each of the capacitors tested 5 microsecond, 300 amp (peak-to peak) pulses. The pulses were passed through the capacitors at 10 second intervals.

The dashed horizontal line at the approximately 4.2 ohm level of ESR indicates the ESR thermal runaway limit. Beyond this limit, heat develops in the internal resistance of the tested capacitor at a faster rate than will transfer away from the capacitor. During thermal runaway the temperature of the electrical connections at the shooped edges 12, 13 rapidly increases until the connections are destroyed.

Figure 4A:
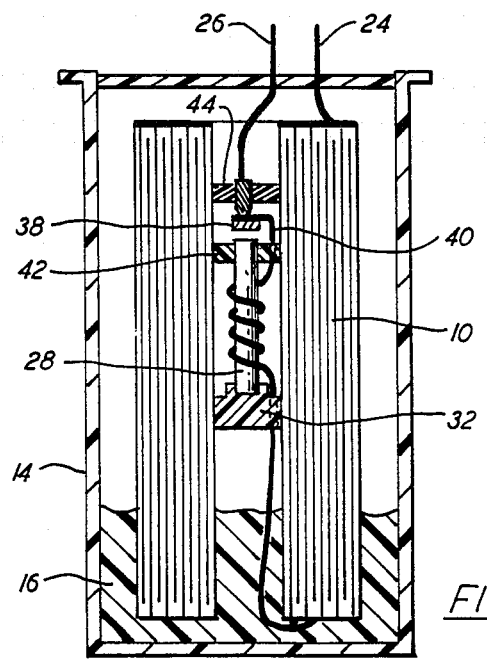
FIG. 4a is cross-sectional view of a fourth embodiment of the invention.

FIG. 4a illustrates a modified version of the FIG. 3 embodiment, in which an electromagnetically-actuated switch is incorporated in the capacitor assembly in series with the inductor. This switch, which is shown in detail in FIG. 4b, includes a pair of normally-closed contacts 36, 38 and a conductive spring wire 40. The spring wire, which is L-shaped, has one end secured in a longitudinally-extending hole 41 in an annular plastic anchor 42 which supports one end of the ferrite rod 28. This end is connected to an adjacent end of the coil 20 by soldering, welding or pressure contact. The other end of the spring wire 40 is connected to the contact 38 by soldering or welding the wire to the surface of the contact. Contact 36 is secured in a central hole in an annular plastic anchor 44. All of the plastic anchors (32, 42 and 44) are press fitted in the hollow central core of the capacitor. Contact 36 is electrically connected to the lead 26 to complete the serial connection between leads 24 and 26 of the switch, the inductor and the capacitor.

Contact 38 is made of a material which is not only electrically conductive, but also ferromagnetic. Suitable materials include tinned iron, nickel or ferrite. This contact, in combination with the spring wire 40, forms a ferromagnetic actuator means for opening the switch in response to current surges of sufficient magnitude and duration to damage the electrical connections at the thin electrodes of the capacitor.

Figure 4B:
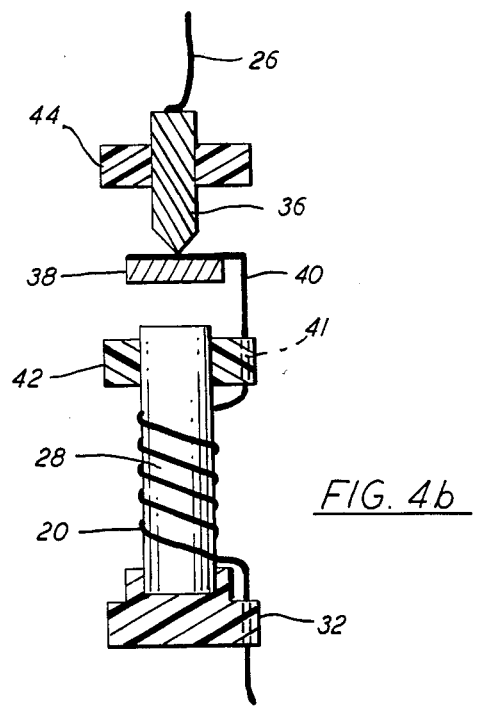
FIG. 4b is a cross-sectional view of a component in the fourth embodiment of the invention.
Figure 4C:
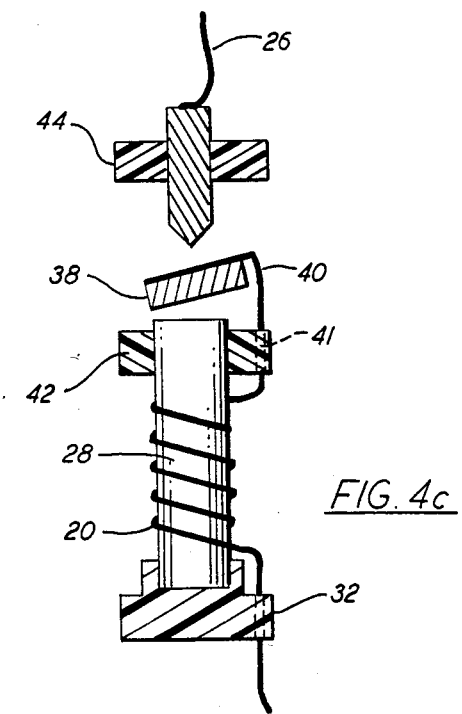
FIG. 4c is a cross-sectional view of the component in operation.

In the normally-closed position, shown in FIG. 4b, contact 38 is urged against contact 36 by spring wire 40. Because contact 38 is disposed adjacent one end of the ferrite rod 28, it is magnetically coupled to the inductor by the magnetic field lines leaving the end of the rod whenever current is passing through the coil. The strength of this magnetic coupling is established such that only current surges having sufficient energy to damage the capacitor electrde connections will develop sufficient magnetomotive force to overcome the force of the spring wire 40 and pull the ferromagnetic contact 38 away from the fixed contact 36. This is achieved by adjusting the spring tension and/or the number of turns in the inductor coil. Whenever a current surge having an energy content greater than can be tolerated by the capacitor electrode connection, the inductor functions as an electromagnet and momentarily opens the switch, as is illustrated in FIG. 4c, thereby interrupting the current. The duration of this interruption can be adjusted by adjusting the distance of travel of the movable contact from the fixed contact, adjusting the mass of the movable contact, or adjusting the spring tension.

A 12.5 microfarad capacitor assembly of the type illustrated in FIG. 4a, and incorporating a 40 microhenry, inductor was also made and tested at an operating voltage of 240 VAC (RMS). Several current pulses, each having an amplitude of 1000 amps and a maximum duration of 5 microseconds, were passed through the capacitor. It was electrically observed that the switch actuated and interrupted the current before any measurable damage was done to the metallic layer electrical connections of the capacitor.

Although specific embodiments of the invention have been described, many variations are possible. For example, in embodiments having ferromagnetic filler material the inductance can be adjusted by varying the concentration of the ferromagnetic particles. As another example, the inductor coil may be wound around the exterior of the container rather than being located internally. Alternatively, the coil could be flattened such that it fits within a relatively small space within the container. For example, the coil could be in the form of a spiral or a series of side-by-side loops.

I claim:

1. A surge-protected metallized dielectric capacitor assembly comprising:
   a. a closed container;
   b. a metallized dielectric capacitor enclosed in the container, said capacitor including first and second metallized insulative layers;
   c. first externally-accessible connection means electrically connected to the first metallized layer;
   d. a ferromagnetic core disposed in space in said container not occupied by the capacitor, said ferromagnetic core comprising a filler material containing ferromagnetic particles;
   e. a conductive coil positioned in the assembly such that it is magnetically coupled to the ferromagnetic core to form an inductor, a first end of said coil being electrically connected to the second metallized layer; and
   f. second externally-accessible connection means electrically connected to a second end of the coil.

2. A surge-protected metallized dielectric capacitor assembly comprising:
   a. a closed container;
   b. a metallized dielectric capacitor enclosed in the container, said capacitor including first and second metallized insulative layers;
   c. first externally-accessible connection means electrically connected to the first metallized layer;
   d. a ferromagnetic core disposed in space in said container not occupied by the capacitor, said ferromagnetic core comprising a filler material containing a predetermined concentration of ferromagnetic particles;
   e. a conductive coil at least partially surrounding the ferromagnetic core and forming therewith an inductor, a first end of said coil being electrically connected to the second metallized layer; and
   f. second externally-accesible connection means electrically connected to a second end of the coil.

3. A capacitor assembly as in claim 1 where the coil is at least partially disposed in the filler material.

4. A capacitor assembly as in claim 1 or 2 where the capacitor includes a hollow core, said ferromagnetic core being at least partially disposed in said hollow core.

5. A capacitor assembly as in claim 4 where the coil is disposed in the hollow core.

6. A capacitor assembly as in claim 4 where the coil is wound around the capacitor.

7. A capacitor assembly as in claim 1 or 2 where the coil is wound around the container.

8. A surge-protected metallized dielectric capacitor assembly comprising:
   a. a closed container;
   b. a metallized dielectric capacitor enclosed in the container, said capacitor including first and second metallized insulative layers;
   c. first externally-accessible connection means electrically connected to the first metallized layer;
   d. a ferromagnetic core disposed in space in said container not occupied by the capacitor;
   e. a conductive coil positioned in the assembly such that it is magnetically coupled to the ferromagnetic core to form an inductor, first end of said coil being electrically connected to the second metallized layer;
   f. second externally-accessible connection means electrically connected to a second end of the coil; and
   g. an electromagnetically-actuated, normally-closed switch electrically connected in series with the coil, said switch comprising ferromagnetic actuator means magnetically coupled to the inductor for opening the switch in response to current surges of predetermined magnitude.

9. A capacitor assembly as in claim 8 where the switch comprises first and second normally-closed contacts and means for resiliently urging said contacts together, said actuator means comprising a ferromagnetic, electrically-conductive member which forms said first contact, said first contact being electromagnetically movable asay from said second contact in response to said current surges of predetermined magnitude.

10. A capacitor assembly as in claim 9 where the capacitor includes a hollow core, said switch being at least partially disposed in said hollow core.

* * * * *